United States Patent [19]

Müller et al.

[11] Patent Number: 5,029,615

[45] Date of Patent: Jul. 9, 1991

[54] METHOD FOR LINING A PIPE LAID IN THE GROUND

[75] Inventors: Hans Müller, Schieder-Schwalenberg; Hermann Suerbaum, Ortsteil, both of Fed. Rep. of Germany

[73] Assignee: Hans Müeller, Schieder-Schwalenberg, Fed. Rep. of Germany

[21] Appl. No.: 377,941

[22] Filed: Jul. 7, 1989

[30] Foreign Application Priority Data

Jul. 21, 1988 [DE] Fed. Rep. of Germany ....... 8809305
Feb. 27, 1989 [DE] Fed. Rep. of Germany ....... 3906057

[51] Int. Cl.$^5$ .............................................. F16L 55/16
[52] U.S. Cl. ..................................... 138/98; 264/269; 405/150; 138/141
[58] Field of Search ...................... 138/97, 98, 99, 141; 264/267, 269, 36; 405/150, 154; 29/402.09

[56] References Cited

U.S. PATENT DOCUMENTS

| 4,009,063 | 2/1977 | Nood ..................... 138/97 |
| 4,714,095 | 12/1987 | Müller et al. ............. 138/97 |
| 4,723,579 | 2/1988 | Hyodo et al. ............. 138/98 |
| 4,770,562 | 9/1988 | Müller et al. ............. 138/97 |

FOREIGN PATENT DOCUMENTS 2362784 5/1982 Fed. Rep. of Germany .
2240153 4/1989 Fed. Rep. of Germany .

Primary Examiner—James E. Bryant, III
Attorney, Agent, or Firm—Michael J. Striker

[57] ABSTRACT

The method for lining a pipe laid in the ground, especially a sewer conduit made from concrete, asbestos cement or stoneware, comprises making a lining tube for the pipe with an outer layer and an inner layer made from fiber fleece and a barrier layer impermeable to fluid located between the inner layer and the outer layer. The outer layer is soaked with a stress-free hardenable plastic resin adhering well to the pipe in one or more regions of over its entire length and the inner layer is soaked with the same or another plastic resin having reduced shrinkage not impairing the outer layer. The lining tube is introduced into the pipe and pressed on the inner surfaces of the pipe to be sanitized. The plastic resin is hardened to form an adhesive bond between the pipe and the outer layer. Advantageously the outer layer is soaked with epoxy resin and the inner layer is soaked with polyester resin. The product of this method, a sanitized conduit, is also described.

9 Claims, No Drawings

METHOD FOR LINING A PIPE LAID IN THE GROUND

BACKGROUND OF THE INVENTION

Our invention relates to a method for lining a pipe laid in the ground, advantageously a waste water conduit made of concrete, asbestos cement or stoneware. It also relates to the sanitized conduit produced by this method.

A method for lining a pipe laid in the ground, especially a sewer conduit made from concrete, asbestos cement or stoneware, uses a lining tube having at least one layer made of a fiber fleece, whose fiber fleece layer is soaked with a hardenable plastic resin. The lining tube is introduced into the pipe, is pressed with a pressurizing medium on the inner surfaces of the pipe to be converted into a sanitary duct or conduit and the plastic resin is hardened.

A method of this type is described in German Patent 22 40 153, in which the lining tube is provided on the outer side with a fluid impermeable layer. Because of this impermeable layer one should be able to omit a previously required cleaning of the pipe. It turns out however that a basic cleaning is necessary, since in any old pipe deposits are always present which can fill a large portion of the flow cross section.

Since a bonding between the lining tube and the inner wall of the pipe can not occur with the fluid impermeable outer layer, unsealed locations, e.g. tears or damaged pipe joints, are not sealed so that water forced in from the earth collects in the annular space between the lining tube and the interior wall. Inspite of a new lining tube in the pipe ground water can filter in and the reverse can occur, i.e. waste water can seep out into the surrounding earth, at lateral inlets and service lines, which must be cut in a known way from the lining tube after installation. The lining tube can not be installed in the pipe by longitudinal sliding. Joining of the service lines can not be performed in the known process in such a way that the joints are water tight. There is a reverse flow which develops between the lining tube introduced and the pipe. Longitudinal shifting of the hardened tube can at least partially obstruct service lines and lateral openings.

The lining tube has an impermeable resin layer on its inner side.

Another method is known and described in German Patent 23 62 784, in which the lining tube fed into the pipe to be sanitized has a resin impermeable layer inside and a layer saturated with plastic resin outside. This lining tube is introduced by being turned inside out in the pipe so that it is put in the pipe with its plastic resin soaked layer facing exteriorly against the inside of the pipe. For the inversion of the two layer lining tube comparatively large forces are necessary because of the felting work in the inversion region. Because of this felting work resin is pressed out from the impregnated fiber layer and must be replaced by air.

In both known processes a lining tube is used, which has exclusively a fiber fleece layer soaked with hardenable plastic resin, so that a plastic resin type must be chosen. The current expensive polyester resin has the disadvantage that it forms no bond with the moist inner side of the pipe to be sanitized and during the hardening shrinks so strongly that a annular space forms between the pipe to be sanitized and the lining tube, which fills with water from the ground, which flows into the annular space through a break location in the old pipe and is forced in the sanitized pipe through service lines and lateral entrances. Also waste water can seep out into the surrounding ground by the same flow path.

SUMMARY OF THE INVENTION

It is an object of the invention to provide a method for converting a pipe laid in the ground in a known way into a sanitary conduit in which an intensely adhering bond between the lining tube and the pipe to be sanitized can be formed with comparatively small amount of plastic resin which hardens free from stress with good adherence.

In keeping with these objects and with others which will become apparent hereinafter, the lining tube is formed with an outer layer and an inner layer made from fiber fleece and a barrier layer impermeable to fluid located between the inner layer and the outer layer. The outer layer is soaked in one or more regions or over its entire length with a stress-free hardenable plastic resin adhering well to the pipe and the inner layer is soaked with the same or another plastic resin having reduced shrinkage not impairing the outer layer and on hardening forms an adhesive bond between the pipe and the outer layer on hardening.

Since the lining tube comprises an outer layer and an inner layer made of a fiber fleece and a fluid-impermeable thin barrier layer located between the outer and the inner layers, the choice of the thickness of the outer layer and also the amount of the plastic resin hardening free of stress and adhering well on the inner surface of the old pipe can be influenced. One suitable plastic resin, which hardens free of stress and has good adherence to the old pipe laid in the ground, is Epoxy resin.

The inner layer of the lining tube comprising a fiber fleece can be soaked e.g. with a polyester resin, to which a chemical agent is added by which the shrinkage is reduced to less than 0.3% on hardening of the polyester resin.

Using these plastic resin types causes the lining tube pressed on the interior wall of the pipe to be sanitized to retain a stable shape during the hardening of the plastic resin and an annular space between the lining tube and the old pipe can no longer occur. The plastic resin of the outer layer does form an adhesive bond with the old pipe so that the old pipe and the lining tube form a unit whose statics are determined largely by the old pipe.

The lining tube used in the process according to our invention can be treated as a tube made exclusively from felt. The outer and inner layers are soaked with resin before introducing the lining tube in the pipe to be sanitized. Since the thin fluid-impermeable barrier layer provided between the outer layer and the inner layer made of fiber fleece is protected by the outer layer on feeding the lining tube into the pipe to be sanitized, it can be extremely thin. The fiber fleece forming the outer layer must be only so thick so that it can receive the quantity of resin necessary for connection with the old pipe.

Our invention also comprises the sanitized conduit produced by this method.

DETAILED DESCRIPTION OF THE INVENTION

The pipe laid in the earth, which has a crack or fissure and an additional break location and also a connected service line, is equipped with a lining tube according to the process or method of our invention. This lining tube has an outer layer and an inner layer, which is made from a fiber fleece, e.g. a felt. Between the outer layer and the inner layer a barrier layer is located, which can be made of a plastic foil tube with a reduced thickness, e.g. 0.5 mm. The foil tube can be made from polyethylene, polypropylene or polyurethane.

In one embodiment the outer layer spans about third of the wall thickness of the lining tube and the inner layer about two thirds of the wall thickness of the lining tube.

As a fiber fleece for the outer layer and for the inner layer a polyester fleece or a glass fiber fleece or a combination of polyester fibers and glass fibers can be used.

As a barrier layer a foil can be used, which forms a unit with the inner and outer felt layers by heat sealing on both sides. The barrier layer can also be a thermoplastic applied to the inner fiber layer in the melted state and the outer felt layer can be applied by adhesion with this barrier layer by heat sealing.

The lining tube in the flattened state is introduced into the pipe to be sanitized, e.g. by a rope and a winch. The expansion of the lining tube occurs by a calibrated tube, which is turned inside-out on the interior of the lining pipe using an inverting tube. The lining tube edge is secured on the upper edge of the inverting tube. As a pressurizing medium for the inversion process and for pressing of the lining tube to the inner surfaces of the pipe water is used, which is heated. In as much as the fiber fleece layers are soaked with the thermoplastic resin system the lining tube is hardened because of the heat provided by the heated water.

After the hardening of the resin system the calibrated tube, which only acts as an assisting means, is removed from the lining tube and is used again.

In one embodiment according to the invention, the lining tube introduced into the pipe has an outer layer, which is chosen so thin that it is unimportant for the static analysis of the hardened lining tube, however it suffices as an adhesive receiving means for saturation with polyester or epoxy resin.

A variation based on this embodiment is particularly significant. In that variation the fiber layer is provided with plastic resin only in a zone, in which shafts and lateral entrances are provided. The making of a bond of the lining with the old pipe is particularly important in this zone, because in this zone waste water can seep out and ground water can leak in.

In another embodiment the outer layer is soaked with plastic resin exclusively in some regions. The other regions are cut open after the hardening of the lining.

It will be understood that each of the elements described above, or two or more together, may also find a useful application in other types of structures differing from the types described above.

While the invention has been illustrated and described as embodied in a method for lining and sanitizing a pipe laid in the ground, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a method for lining a pipe laid in the ground, especially a sewer conduit made from concrete, asbestos cement or stoneware, using a lining tube having at least one layer made of a fiber fleece, comprising the steps of soaking said layer of fiber fleece with a hardenable plastic resin, feeding said lining tube into said pipe, pressing said lining tube with a pressurizing medium on the inner surfaces of said pipe to be lined and hardening said plastic resin, the improvement comprising the steps of:
   a. forming said lining tube with an outer layer and an inner layer made from said fiber fleece and a barrier layer impermeable to fluid located between said inner layer and said outer layer;
   b. soaking said outer layer in at least one region over its entire length with a stress-free hardenable plastic resin adhering well to said pipe;
   c. soaking said inner layer with said or another plastic resin having reduced shrinkage not damaging to said outer layer; and
   d. forming an adhesive bond between said pipe and said outer layer during hardening.

2. The improvement according to claim 1 wherein said soaking said outer layer comprising soaking an epoxy resin into said outer layer, said soaking of said inner layer comprising soaking a polyester resin into said inner layer and adding a chemical agent to said polyester resin to reduce said shrinkage to less than 0.3%.

3. The improvement according to claim 1 wherein said forming includes making said barrier layer of a foil which forms a bond with said inner and outer layer on both sides by heat sealing.

4. The improvement according to claim 3 further comprising selecting said foil from the group consisting of polyethylene, polypropylene and polyurethane.

5. The improvement according to claim 1 wherein said forming includes making said barrier layer of a thermoplastic applied to said inner layer in a melt state, and making said outer layer of felt applied by adhesion to said barrier layer by heat sealing.

6. The improvement according to claim 5 further comprising selecting said said thermoplastic from the group consisting of polyethylene, polypropylene and polyurethane.

7. The improvement according to claim 1 further comprising choosing the thickness of said outer layer about one-third of the thickness of said lining tube and choosing the thickness of said inner layer about two-thirds of said thickness of said lining tube.

8. The improvement according to claim 1 further comprising selecting said fiber fleece from the group consisting of a polyester fleece, a glass fiber fleece and a combination of said polyester fleece and said glass fiber fleece.

9. The improvement according to claim 1 further comprising choosing a thickness of said outer layer so that said outer layer is unimportant for static analysis of said lining tube, however is sufficient as a receiving means for soaking with said plastic resin.

* * * * *